United States Patent [19]

Estelle

[11] Patent Number: 5,247,324
[45] Date of Patent: Sep. 21, 1993

[54] REAL IMAGE ZOOM VIEWFINDER
[75] Inventor: Lee R. Estelle, Rochester, N.Y.
[73] Assignee: Eastman Kodak Company, Rochester, N.Y.
[21] Appl. No.: 807,532
[22] Filed: Dec. 13, 1991
[51] Int. Cl.$^5$ .............................................. G03B 13/10
[52] U.S. Cl. ................................... 354/222; 354/199; 359/676; 359/679
[58] Field of Search ............... 354/222, 224, 225, 199, 354/219; 359/679, 676, 686

[56] References Cited
U.S. PATENT DOCUMENTS

| | | |
|---|---|---|
| 4,725,130 | 2/1988 | Ozawa . |
| 4,805,999 | 2/1989 | Ueda et al. ........................ 359/679 |
| 4,854,680 | 8/1989 | Kikuchi . |
| 4,906,078 | 3/1990 | Inabata et al. . |
| 5,005,955 | 4/1991 | Ohshita . |
| 5,081,480 | 1/1992 | Abe ................................... 354/222 |
| 5,130,845 | 7/1992 | Ruben ............................... 354/219 |
| 5,136,430 | 8/1992 | Hamanishi ........................ 359/676 |
| 5,173,727 | 12/1992 | Lewis ............................... 354/222 |

Primary Examiner—Monroe H. Hayes
Attorney, Agent, or Firm—Svetlana Z. Short

[57] ABSTRACT

A compact real image zoom finder suitable for compact cameras, and the like whose zoom ratio is about 2. The zoom finder comprises: (a) an objective including four lens units having positive, negative, positive and negative refractive powers in order from an object side. The first and the fourth lens units are fixed and the second and the third lens units are moved to perform zooming; (b) a stationary field lens and; (c) a rotating assembly and an eyepiece combination.

11 Claims, 1 Drawing Sheet

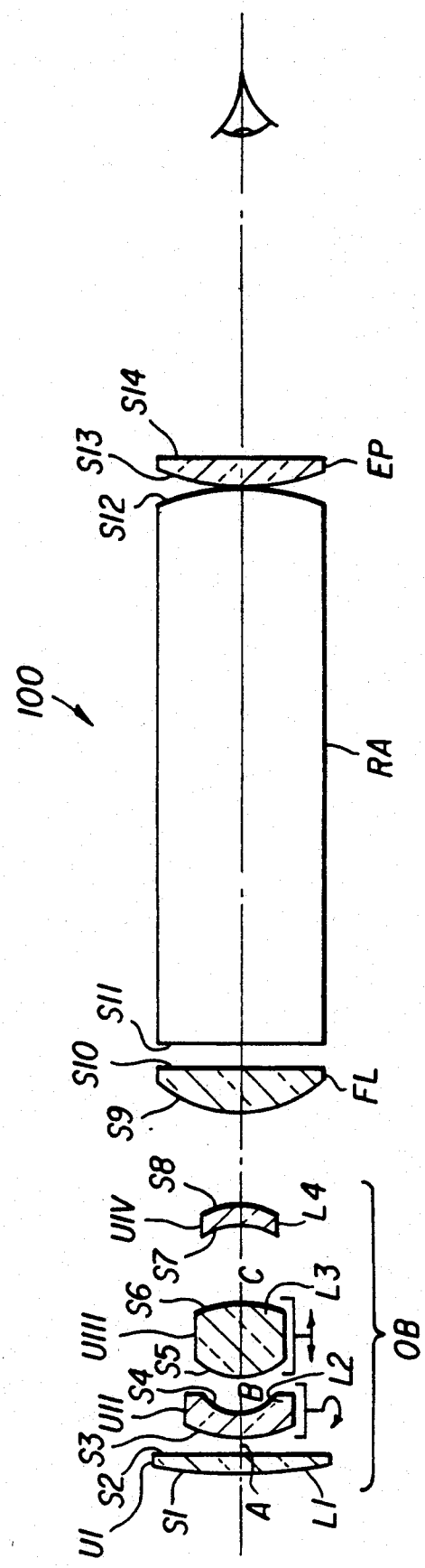

REAL IMAGE ZOOM VIEWFINDER

BACKGROUND OF THE INVENTION

1. Field of the Invention

This invention relates to zoom viewfinders having a zoom ratio of about 2.

2. Description of the Prior Art

Generally speaking, zoom viewfinders tend to be long and large in diameter because the eye point is at the aperture stop and of necessity the aperture stop is typically located outside the lens at the eye location (for eye relief).

Real image zoom finders, because of the presence of a field lens, allow control of the frame of the clear aperture which is not possible with inverse galilean type finders. However, in a real image finder, the field lens together with eyepiece and zooming objective, undesirably create field curvature not found in an inverse galilean finder.

SUMMARY OF THE INVENTION

It is therefore an object of the present invention to create a compact real-image zoom viewfinder having low field curvature.

It is another object of the present invention to create a zoom finder (viewfinder) which has stationary outer elements in order to protect the (internal) zoom mechanism from dust and other contaminants.

It is another object of this invention to create a real image zoom finder having constant axial accommodation.

The above and other objects are achieved by a zoom finder comprising in order from an object side: (a) a lens objective including a stationary first lens unit having positive refractive power, a movable second lens unit having negative refractive power, a movable third lens unit having positive refractive power and a stationary fourth lens unit, said second and said third units move for zooming; (b) a stationary field lens having positive refractive power; and (c) a rotating assembly and an eyepiece combination.

BRIEF DESCRIPTION OF THE DRAWINGS

The accompanying figure is a side view of a zoom viewfinder that forms a preferred embodiment of the invention.

DETAILED DESCRIPTION OF THE PREFERRED EMBODIMENT

The lens system of the present invention has a general application to optical systems employing zoom viewfinders. An example of such application is a viewfinder suitable for use in compact cameras. In order to provide a concise description of the preferred embodiment, certain details of the viewfinder and camera in which it may be used are not described herein but are selectable from the prior art.

The lens system forming the real image viewfinder of the preferred embodiment of the present invention will now be described with reference being made to the accompanying figure. The lens system 100 is characterized by 2× zoom range and also in overall compactness aperture. The viewfinder has high image quality and low field curvature. The outer elements of the zoom finder are fixed in position. This is helpful for keeping dust and dirt out of the mechanism. The lens system 100 includes a lens objective OB, a field lens element FL having positive refractive power and a rotating assembly RA and an eyepiece lens element EP combination. The lens objective contains four optical units UI, UII, UIII and UIV with air spaces A, B and C between these units. Constant axial accomodation is achieved by use of two internal moving optical units UII and UIII.

Following from the object to pupil location the lens units are: A positive power lens unit UI, which is stationary (i.e. it does not move for zooming); a negative optical unit UII, movable along the optical axis for zooming and performing as a compensator; a positive optical unit UIII movable along the optical axis for zooming and performing as a variator; and a stationary optical unit UIV. The rotating assembly RA of the present embodiment is an extending prism such as a TYPE-2 Porro prism. The lens objective part of the viewfinder forms an image on the front surface 11 of the Porro prism. The reticle is also located on the surface 11. The image formed by the objective part of the viewfinder is viewed by the eye using the rotating assembly RA, i.e. the extending prism, and the eyepiece combination. The function of the rotating assembly RA is to invert and revert the image before presenting it to the eye. The field curvature of the viewfinder is successfully minimized by choice of the aspheric elements and by having a positive moving group unit UIII and a negative moving unit UII. The field lens FL redirects principal rays to achieve compactness and to control aberration. More specifically and starting from the object side, the first lens unit UI comprises a positive lens element L1; the second lens unit UII comprises a negative meniscus lens element L2 with a concave surface oriented towards the third lens unit; the third lens unit UIII comprises a positive biconvex lens element L3; and the fourth lens unit UIV comprises a negative meniscus lens element L4 with a concave surface oriented towards the third lens unit. All of the lens elements including the Porro prism may be made of plastic to make the production of the viewfinder relatively inexpensive. The numerical data for the optical system 100 are as follows:

| SURFACE | CLEAR APER. | RADIUS | THICKNESS | MATERIAL |
|---|---|---|---|---|
| 1 | 9.83 | 30.19 | 1.00 | 590309 |
| 2 | 9.27 | PLANO | A | |
| 3 | 6.54 | 15.10 | 1.30 | 590309 |
| 4 | 4.10 | ASPHERE | B | |
| 5 | 4.35 | 3.10 | 4.40 | 492574 |
| 6 | 2.91 | ASPHERE | C | |
| 7 | 3.14 | ASPHERE | 1.20 | 590309 |
| 8 | 4.01 | −3.82 | 5.51 | |
| 9 | 7.62 | ASPHERE | 2.62 | 492574 |
| 10 | 7.45 | PLANO | 1.20 | |
| 11 | 7.51 | PLANO | 31.62 | 492574 |
| 12 | 9.74 | −21.21 | 0.20 | |
| 13 | 9.57 | 19.87 | 1.58 | 492574 |
| 14 | 9.30 | 121.84 | | |

ASPHERIC EQUATION:

$$X = \frac{CY^2}{1 + \sqrt{1 - (k+1)C^2Y^2}} + DY^4 + EY^6 + FY^8 + GY^{10} + HY^{12} + IY^{14} + JY^{12} + KY^{14}$$

SURFACE 4
C = 0.416   D = 0.882E-02   H = −0.233E-03
k = −0.874  E = 0.875E-03   I = 0.412E-04
             F = −0.767E-03  J = −0.280E-05
             G = 0.634E-03   K = 0.0
VERTEX RADIUS = 2.402

SUR-   C = −0.160   D = −0.205E-02   H = −0.236E-02

-continued

| | | | | | | |
|---|---|---|---|---|---|---|
| FACE 6 | k = | 0 | E = | 0.126E-01 | I = | 0.343E-03 |
| | | | F = | −0.124E-01 | J = | −0.185E-04 |
| | | | G = | 0.757E-02 | K = | 0.0 |
| | | | VERTEX RADIUS = −6.267 | | | |
| SUR-FACE 7 | C = k = | −0.362 0 | D = E = | −0.137E-01 0.198E-01 | H = I = | −0.354E-02 0.415E-03 |
| | | | F = | −0.192E-01 | J = | 0.501E-05 |
| | | | G = | 0.115E-01 | K = | 0.0 |
| | | | VERTEX RADIUS = −2.760 | | | |
| SUR-FACE 9 | C = k = | 0.108 0 | D = E = | 0.757E-02 −0.202E-02 | H = I = | 0.257E-05 −0.942E-07 |
| | | | F = | 0.362E-03 | J = | 0.179E-08 |
| | | | G = | −0.397E-04 | K = | −0.137E-10 |
| | | | VERTEX RADIUS = 9.221 | | | |

NOTES:

| MAG. | DISTANCE A | B | C | SEMI-FIELD |
|---|---|---|---|---|
| .242 | 1.13 | 5.31 | 1.06 | 34.7 |
| .334 | 1.68 | 3.45 | 2.37 | 26.6 |
| .464 | 1.13 | 2.00 | 4.37 | 19.8 |

RETICLE SHAPE: L = 6.22 R$_1$ = 89.25
W = 4.18 R$_2$ = 294.5

Where L is arc length and W is arc width, R$_1$ is the center of curvature that determines the arc length, R$_2$ is the center of curvature that determines the arc width.
INSIDE DIMENSIONS ARE FOR 88% OF A 22.4 × 32.1 FORMAT.

The space B between the optical units II and III in the above embodiment is movable for zooming. This appears to allow for superior performance for this type of lens system while maintaining the compactness of the overall system. The movement of UII and UIII relative to each other and to the stationary units UI and UIV provides a real image plane that is located on the first surface of the TYPE-2 Porro prism constituting an erecting assembly in this embodiment. This image plane is stationary and thus there is no need for the eye to adjust its focus as the finder is zooming. If the spacing B between units UII and UIII is kept constant, and the inner units move together at the same rate (for simplified mechanical considerations), the axial accomodation will vary with zoom position, but the image will still be viewable.

Although in the preferred embodiment each optical unit corresponds to a single lens element or lens component, in a modification one may split one of these lens components into two or more optical elements or components.

Finally, although each of the lens elements in the preferred embodiment are described as made of plastic, in a modification one may design the viewfinder with glass lens elements.

The invention has been described in detail with particular reference to a preferred embodiment thereof, but it will be understood that variations and modifications can be effected within the spirit and scope of the invention.

I claim

1. A zoom viewfinder comprising in order from an object side:
   (a) a lens objective including a stationary first lens unit having positive refractive power, a movable second lens unit having negative refractive power, a movable third lens unit having positive refractive power and a stationary fourth lens unit, said second and third units being movable for zooming;
   (b) a stationary field lens having refractive power; and
   (c) a rotating assembly and an eyepiece combination.

2. A zoom finder according to claim 1, wherein each lens element is of a plastic material.

3. A zoom finder according to claim 1, wherein each of the lens units of the lens objective is a single lens element.

4. A zoom finder according to claim 3, wherein:
   said first lens unit comprises a positive lens element;
   said second lens unit comprises a negative meniscus lens element with a concave surface oriented toward the third lens unit;
   said third lens unit comprises a positive biconvex lens element; and
   said fourth lens unit comprises a negative meniscus lens element.

5. A zoom finder according to claim 1 comprising the following design parameters

| SURFACE | CLEAR APER. | RADIUS | THICK-NESS | MATERIAL |
|---|---|---|---|---|
| 1 | 9.83 | 30.19 | 1.00 | 590309 |
| 2 | 9.27 | PLANO | A | |
| 3 | 6.54 | 15.10 | 1.30 | 590309 |
| 4 | 4.10 | ASPHERE | B | |
| 5 | 4.35 | 3.10 | 4.40 | 492574 |
| 6 | 2.91 | ASPHERE | C | |
| 7 | 3.14 | ASPHERE | 1.20 | 590309 |
| 8 | 4.01 | −3.82 | 5.51 | |
| 9 | 7.62 | ASPHERE | 2.62 | 492574 |
| 10 | 7.45 | PLANO | 1.20 | |
| 11 | 7.51 | PLANO | 31.62 | 492574 |
| 12 | 9.74 | −21.21 | 0.20 | |
| 13 | 9.57 | 19.87 | 1.58 | 492574 |
| 14 | 9.30 | 121.84 | | |

ASPHERIC EQUATION:

$$X = \frac{CY^2}{1 + \sqrt{1 - (k+1)C^2Y^2}} + DY^4 + EY^6 + FY^8 + GY^{10} + HY^{12} + IY^{14} + JY^{12} + KY^{14}$$

| | | | | | | |
|---|---|---|---|---|---|---|
| SUR-FACE 4 | C = k = | 0.416 −0.874 | D = E = | 0.882E-02 0.875E-03 | H = I = | −0.233E-03 0.412E-04 |
| | | | F = | −0.767E-03 | J = | −0.280E-05 |
| | | | G = | 0.634E-03 | K = | 0.0 |
| | | | VERTEX RADIUS = 2.402 | | | |
| SUR-FACE 6 | C = k = | −0.160 0 | D = E = | −0.205E-02 0.126E-01 | H = I = | −0.236E-02 0.343E-03 |
| | | | F = | −0.124E-01 | J = | −0.185E-04 |
| | | | G = | 0.757E-02 | K = | 0.0 |
| | | | VERTEX RADIUS = −6.267 | | | |
| SUR-FACE 7 | C = k = | −0.362 0 | D = E = | −0.137E-01 0.198E-01 | H = I = | −0.354E-02 0.415E-03 |
| | | | F = | −0.192E-01 | J = | 0.501E-05 |
| | | | G = | 0.115E-01 | K = | 0.0 |
| | | | VERTEX RADIUS = −2.760 | | | |
| SUR-FACE 9 | C = k = | 0.108 0 | D = E = | 0.757E-02 −0.202E-02 | H = I = | 0.257E-05 −0.942E-07 |
| | | | F = | 0.362E-03 | J = | 0.179E-08 |
| | | | G = | −0.397E-04 | K = | −0.137E-10 |
| | | | VERTEX RADIUS = 9.221 | | | |

NOTES:

| MAG. | DISTANCE A | B | C | SEMI-FIELD |
|---|---|---|---|---|
| .242 | 1.13 | 5.31 | 1.06 | 34.7 |
| .334 | 1.68 | 3.45 | 2.37 | 26.6 |
| .464 | 1.13 | 2.00 | 4.37 | 19.8 |

RETICLE SHAPE: L = 6.22 R$_1$ = 89.25
W = 4.18 R$_2$ = 294.5

Where L is arc length and W is arc width, R$_1$ is the center of curvature that determines the arc length, R$_2$ is the center of curvature that determines the arc width
INSIDE DIMENSIONS ARE FOR 88% OF A 22.4 × 32.1 FORMAT.

6. A zoom finder comprising in order from an object side, a stationary first lens unit having positive refractive power, a movable second lens unit having negative refractive power, a movable third lens unit having positive refractive power and a stationary fourth lens unit having said second and said third units being movable for zooming so that a space between said second lens unit and said third lens unit varies for zooming.

7. A zoom finder according to claim 6 further having lens elements with aspherical surfaces.

8. A zoom finder according to claim 7 wherein:
   said first lens unit comprises a positive lens element;
   said second lens unit comprises a negative meniscus lens element with a concave surface oriented toward the third lens unit;
   said third lens unit comprises a positive biconvex lens element;
   said fourth lens unit comprises a negative meniscus lens element.

9. A zoom finder according to claim 8 and including a field lens element, a rotating assembly and an eyepiece element and wherein the first, second, third, fourth, and field lens elements provide a real image plane that is located on a first surface of the rotating assembly.

10. The zoom finder according to claim 9, wherein the rotating assembly comprises a porro prism.

11. A zoom viewfinder according to claim 1, wherein:
   said first lens unit comprises a positive lens element;
   said second lens unit comprises a negative meniscus lens element with a concave surface oriented toward the third lens unit;
   said third lens unit comprises a positive biconvex lens element; and
   said fourth lens unit comprises a negative meniscus lens element.

* * * * *